US008016717B2

(12) United States Patent  (10) Patent No.: US 8,016,717 B2
Ebner et al.  (45) Date of Patent: Sep. 13, 2011

(54) MOTOR VEHICLE DRIVE TRAIN AND METHOD FOR CONTROLLING A DRIVE TRAIN

(75) Inventors: Norbert Ebner, Ludwigsburg (DE); Pascal Heusler, Tokyo (JP); Anton Rink, Calw (DE)

(73) Assignee: Daimler AG, Stuttgart (DE)

( * ) Notice: Subject to any disclaimer, the term of this patent is extended or adjusted under 35 U.S.C. 154(b) by 961 days.

(21) Appl. No.: 11/973,360

(22) Filed: Oct. 4, 2007

(65) Prior Publication Data

US 2008/0214352 A1 Sep. 4, 2008

Related U.S. Application Data

(63) Continuation-in-part of application No. PCT/EP2006/003048, filed on Apr. 4, 2006.

(30) Foreign Application Priority Data

Apr. 5, 2005 (DE) .......................... 10 2005 015 485

(51) Int. Cl.
  *B60K 1/02* (2006.01)
(52) U.S. Cl. .................... 477/3; 180/66.275; 180/66.285
(58) Field of Classification Search ........................ None
  See application file for complete search history.

(56) References Cited

U.S. PATENT DOCUMENTS

| 3,772,933 | A | 11/1973 | Prenzel et al. |
| 4,625,840 | A | 12/1986 | Kojima et al. |
| 4,633,987 | A | 1/1987 | Rögner et al. |
| 4,719,812 | A | 1/1988 | Machida et al. |
| 5,417,124 | A | 5/1995 | Huff et al. |
| 6,233,508 | B1 * | 5/2001 | Deguchi et al. ................. 701/22 |
| 6,354,165 | B1 | 3/2002 | Schnitzer et al. |
| 2003/0168266 | A1 | 9/2003 | Sasuki et al. |
| 2005/0054480 | A1 * | 3/2005 | Ortmann et al. .................. 477/6 |

FOREIGN PATENT DOCUMENTS

| DE | 39 38 402 | 8/1990 |
| DE | 195 28 628 | 2/1997 |
| DE | 697 11 286 | 3/2002 |
| DE | 100 54 561 | 5/2002 |
| EP | 0 121 168 | 10/1984 |
| EP | 0 592 170 | 4/1994 |
| EP | 0 754 588 | 1/1997 |
| EP | 1 136 308 | 9/2002 |

(Continued)

OTHER PUBLICATIONS 2006800198444, na, China.

(Continued)

*Primary Examiner* — David D Le
*Assistant Examiner* — Jacob S Scott
(74) *Attorney, Agent, or Firm* — Klaus J. Bach

(57) ABSTRACT

In a drive train of a motor vehicle comprising an internal combustion engine, at least one electrical machine which can be operated at least as a motor or as a generator, and a stepped automated manual transmission and at least one control device for controlling the internal combustion engine, the at least one electrical machine (P1, P2) and the stepped automated manual transmission and a method of operating the drive train, a braking torque on the driven wheels is kept approximately constant before, during and after a gear-shifting operation to a gear with a higher transmission ratio so as to avoid any jerks during such down shifting procedure.

6 Claims, 4 Drawing Sheets

FOREIGN PATENT DOCUMENTS

| | | |
|---|---|---|
| EP | 1 515 069 | 3/2005 |
| JP | 11 343891 | 12/1994 |
| JP | 2004-80967 | 3/2004 |
| JP | 2004-245325 | 9/2004 |
| WO | WO 98/31559 | 7/1998 |
| WO | WO 2004/038262 | 5/2004 |
| WO | WO 2005/037590 | 4/2005 |

OTHER PUBLICATIONS

DIANDONGQICHE, 2002, na.

* cited by examiner

MOTOR VEHICLE DRIVE TRAIN AND METHOD FOR CONTROLLING A DRIVE TRAIN

This is a Continuation-In-Part Application of pending international Patent Application PCT/EP2006/003048 filed Apr. 4, 2006 and claiming the priority of German Patent Application 10 2005 015 485.9 filed Apr. 5, 2005.

BACKGROUND OF THE INVENTION

The invention relates to a drive train of a motor vehicle comprising an internal combustion engine having at least one electrical motor which can be operated as a generator connected to the engine, a stepped automated manual transmission and at least one control device for controlling the internal combustion engine, the at least one electrical motor and the stepped automated manual transmission, and also to a method for controlling the operation of such a drive train.

In vehicles comprising an internal combustion engine and an electric motor as drives, the electrical motor is advantageously also operable as a generator in order to recover braking energy (recuperation).

DE 195 28 628 discloses a hybrid drive for a motor vehicle comprising an internal combustion engine and an electric motor as drives, in which hybrid drive the electric motor can be operated as a drive motor, generator or as a synchronizer for a change-speed transmission. The generator power of the electric motor is controlled in such a way that an approximately equal vehicle deceleration is achieved in all gears. If a gear change is to be initiated, the internal combustion engine is first disconnected from the drive shaft of the transmission by a clutch and, at the same time, the electric motor is activated as a synchronizer. The purpose of operation of the electric motor during the gear-shifting operation is therefore no longer recuperation but acceleration or braking of the drive shaft to the rotational speed which is required for the transmission ratio to be selected. When shifting to a lower gear, in the case of which the rotational speed of the internal combustion engine has to be increased for the engagement of a lower gear, the electric motor accelerates the drive shaft. Therefore, no braking energy can be recuperated during the gear-shifting operation to a lower gear.

In vehicles with a conventional internal combustion engine drive and a stepped automated manual transmission, it is known that, for reasons of comfort, shifting times when shifting down to a lower gear are extended by approximately 0.5 second to 1 second when the vehicle is coasting. This is known as coasting shifting.

The noticeable jerk when selecting the lower gear or the acceleration of the internal combustion engine which is required as a result can be avoided, for example, by a continuously variable transmission (CVT) being used instead of a stepped manual transmission.

US 2003/0168266 discloses a control means for a braking system which comprises an electrical machine which can be operated as a generator, a CVT transmission and a control device. The recuperation torque of the electrical machine is transmitted to a drive wheel via the gears. In order to avoid an excessively high braking torque on the drive wheel, the recuperation torque of the electrical machine is limited as a function of the transmission ratio i. Therefore, if the transmission ratio i increases, the maximum possible recuperation torque becomes smaller.

It is the object of the present invention to maximize the recuperation energy in a vehicle without any losses in comfort and also to increase vehicle safety.

SUMMARY OF THE INVENTION

In a drive train of a motor vehicle comprising an internal combustion engine, at least one electrical machine which can be operated at least as a motor or as a generator, and a stepped automated manual transmission and at least one control device for controlling the internal combustion engine, the at least one electrical machine (P1, P2) and the stepped automated manual transmission and a method of operating the drive train, a braking torque on the driven wheels is kept approximately constant before, during and after a gear-shifting operation to a gear with a higher transmission ratio so as to avoid any jerks during such down shifting procedure.

With this procedure, a complex and expensive continuously variable transmission is not needed in order to avoid jerks during the shifting operation. On account of the gear-shifting operation not being noticed, driving comfort is improved and coasting shifting can be dispensed with, as a result of which, in turn, more braking energy can be recuperated and the vehicle can react more spontaneously to a change in the driver's wishes on account of the abbreviated gear-shifting operation. An approximately constant braking torque on the wheel has a positive effect on the driving dynamics and ensures reliable driving operation.

Also, a drive train according to the invention of a vehicle can advantageously be used for the situation where the jerk caused by a gear-shifting operation to a gear with a lower transmission ratio i (shifting up) is reduced or pre-vented by a corresponding change in torque of the at least one electrical machine. In comparison with known compensation by means of the internal combustion engine, compensation with the at least one electrical machine is distinguished by improved consumption.

The invention will become more readily apparent from the following description of exemplary embodiments of the invention explained in greater detail in the following description on the basis of the accompanying drawings:

DESCRIPTION OF PARTICULAR EMBODIMENTS

Figure 1:
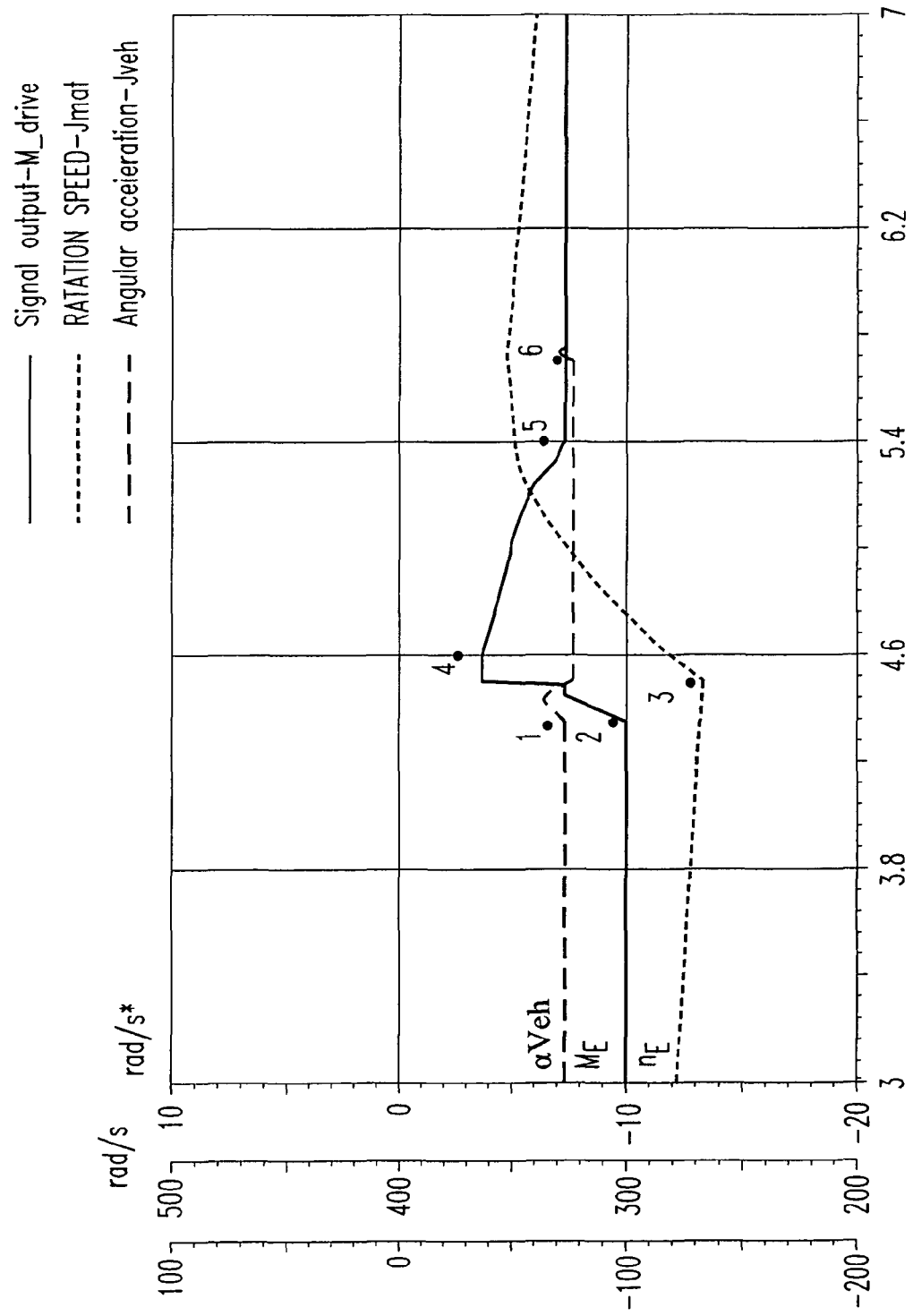
FIG. 1 shows a graph with the characteristic curve of the rotational speed and of the torque at the transmission input and of the angular acceleration on a driven wheel in the event of back-shifting.

The graph which is illustrated in FIG. 1 shows the characteristic curve of the rotational speed $n_E$ and of the torque $M_E$ at the transmission input E and of the angular acceleration $\alpha_{Veh}$ on a driven wheel R (acceleration of the reduced vehicle mass) for a vehicle comprising an internal combustion engine VM, at least one electrical machine P1, P2 and a stepped fully automated transmission G with a hydrodynamic torque converter and a planetary gear system. The acceleration of the vehicle is given by the product of the angular acceleration $\alpha_{Veh}$ on a driven wheel R and the dynamic rolling radius of the wheel. The axial transmission ratio is disregarded for qualitative reasons. For the present invention, the vehicle acceleration or the angular acceleration $\alpha_{Veh}$ on a driven wheel R is to be set equal to the torque on a driven wheel R.

The transmission input torque $M_E$ is given by the torques of the internal combustion engine VM and of the at least one electrical machine P1, P2.

Instead of the stepped fully automated transmission G with a hydrodynamic torque converter and a planetary gear system, the method according to the invention and the drive train according to the invention can also contain a different stepped automated transmission, for example a customary countershaft transmission with a clutch, or a twin clutch drive.

Equally, instead of only one electrical machine, the method according to the invention and the drive train according to the invention can also contain a plurality of electrical machines. The torque, which is described below, of the electrical machine is then to be regarded as the total torque of the electrical machines.

Before time 1 in the illustrated graph, the constant negative angular acceleration $\alpha_{Veh}$ and the linearly decreasing transmission input rotational speed $n_E$ show that the vehicle is in a state of constant deceleration. During the recuperation mode, braking energy is recovered by the electrical machine P1, P2, in this case in the generator mode.

If the vehicle deceleration is caused, for example, by an increase in the road profile, it may also be possible that no braking energy is recuperated. The method according to the invention and the drive train according to the invention can nevertheless be applied.

At time 1, the gear-shifting operation to a lower gear is initiated. Disengagement and engagement of the corresponding clutches of the transmission G is started at time 2.

Opening of the disengaging clutch is terminated at time 3.

The engaging clutch is operated as a slip clutch starting from time 3 until time 6, and this leads to an increasing transmission input rotational speed $n_E$.

Starting from time 2, the torque of the electrical machine P1, P2 is controlled in such a way that it compensates for the torque which is required for acceleration of the internal combustion engine VM. The compensation torque of the electrical machine P1, P2 therefore corresponds to the magnitude of the torque which the internal combustion engine VM requires for acceleration from a driven wheel R. Therefore, the braking torque on the driven wheel R and the angular acceleration $\alpha_{Veh}$ remain approximately constant. The compensation torque of the electrical machine P1, P2 is provided by the electrical machine P1, P2 in addition to the recuperation torque or the drive torque of the electrical machine P1, P2. Until time 4, a greater compensation torque of the electrical machine P1, P2 is required in order to compensate for the moment of inertia of the internal combustion engine VM, said compensation torque being reduced to zero again starting from time 4 until time 5. Precise control of the compensation torque of the electrical machine P1, P2 depends on the respective dynamics of the internal combustion engine VM.

The described control is advantageously a pilot control which avoids a control deviation and therefore a noticeable jerk. It may be necessary to adjust minor control deviations which are not noticeable as a jerk.

The gear-shifting operation is concluded at time 6. The angular acceleration $\alpha_{Veh}$ remains constant at the value before initiation of the gear-shifting operation at time 1.

As is clear from the angular acceleration $\alpha_{Veh}$, according to the invention the torque on a driven wheel R is kept approximately constant before, during and after the gear-shifting operation. The angular acceleration $\alpha_{Veh}$ is regarded as being approximately constant when a change in the vehicle acceleration is at least so low that it cannot be perceived as a jerk by the driver. The vehicle jerk $j_{Veh}$, which is calculated using the following equation $$j_{Veh} = \frac{d}{dt}\left(\frac{\text{Angular acceleration of the wheel} *}{\text{Dynamic rolling radius of the wheel}}\right)$$

as after time 1, is preferably less than $$3 = \frac{m}{s^3}.$$

Figure 2:
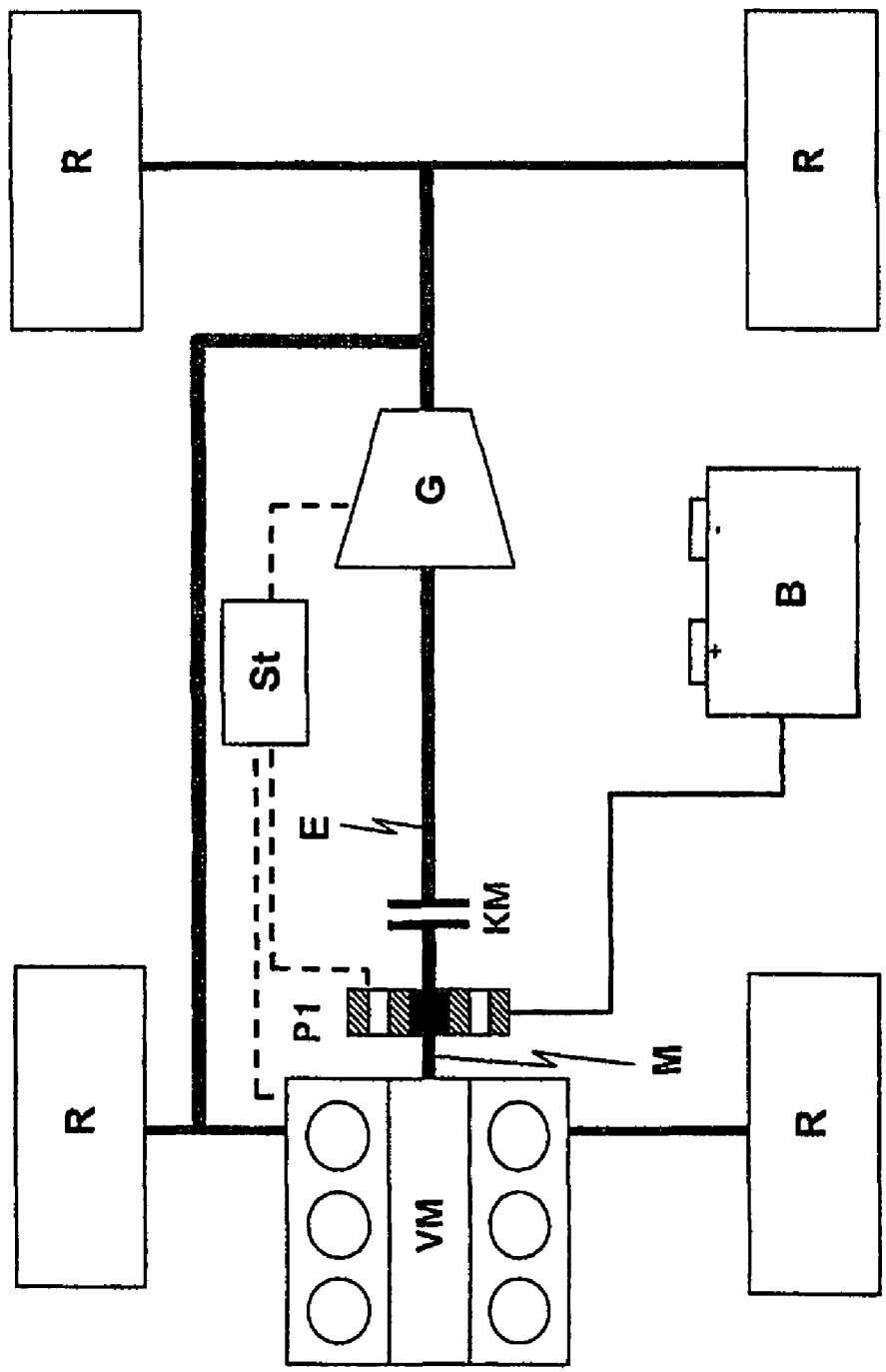
FIG. 2 shows a schematic configuration of a vehicle comprising an internal combustion engine and an electrical machine which is arranged on the motor shaft.

FIG. 2 shows schematically a configuration of a vehicle comprising an internal combustion engine VM and an electrical machine P1 which is arranged on the motor shaft M, and is supplied with electrical energy by a battery B or supplies energy to said battery in the generator mode.

The electrical machine P1 has a stator which is fixed to the housing and interacts with a rotor for generating a drive torque and/or for recuperating electrical energy. The rotor is connected to the motor shaft M such that it is fixed to the drive, with the result that a torque can be provided to the drive train or else a torque which is present in the drive train can be used (at least partially) to recuperate electrical energy by means of the electrical machine P1, in addition to the internal combustion engine VM.

Therefore, according to the invention, the torque which is required for acceleration of the internal combustion engine VM can be compensated for by the electrical machine P1 and a braking torque on the wheels R can therefore be kept approximately constant.

If the gear-shifting operation according to the invention takes place during a recuperation mode in which the recuperation torque is greater than, or equal to, the torque which is required for accelerating the internal combustion engine VM, the recuperation torque of the electrical machine P1 can be reduced by the amount which is required for acceleration of the internal combustion engine VM. Therefore, braking energy can furthermore be recuperated during acceleration of the internal combustion engine VM.

If the gear-shifting operation according to the invention takes place during a recuperation mode in which the recuperation torque is less than the torque which is required for the acceleration of the internal combustion engine VM or the gear-shifting operation takes place during a vehicle deceleration which is caused by external factors, for example the vehicle traveling uphill, and in which no braking energy is recuperated, the electrical machine P1 can provide a drive torque which compensates for the braking action of the internal combustion engine VM. The drive torque of the electrical machine P1 therefore has to correspond to the magnitude of the difference between the torque which is required for acceleration of the internal combustion engine VM and the initial recuperation torque.

The compensation torque of the electrical machine P1 is controlled in accordance with the explanations relating to FIG. 1.

The motor shaft M may be connected directly to the input shaft E of a stepped automated transmission G via a clutch KM.

The clutch KM may be a dry or wet clutch with a partial or full starting functionality.

The output of the transmission G is connected to the driven wheels R. It is likewise possible for only the wheels of one axle to be driven.

The electrical machine P1 and the internal combustion engine VM and the stepped automated transmission G are acted on and operated by at least one control device St according to the invention. Interaction with further control devices is likewise possible.

Figure 3:
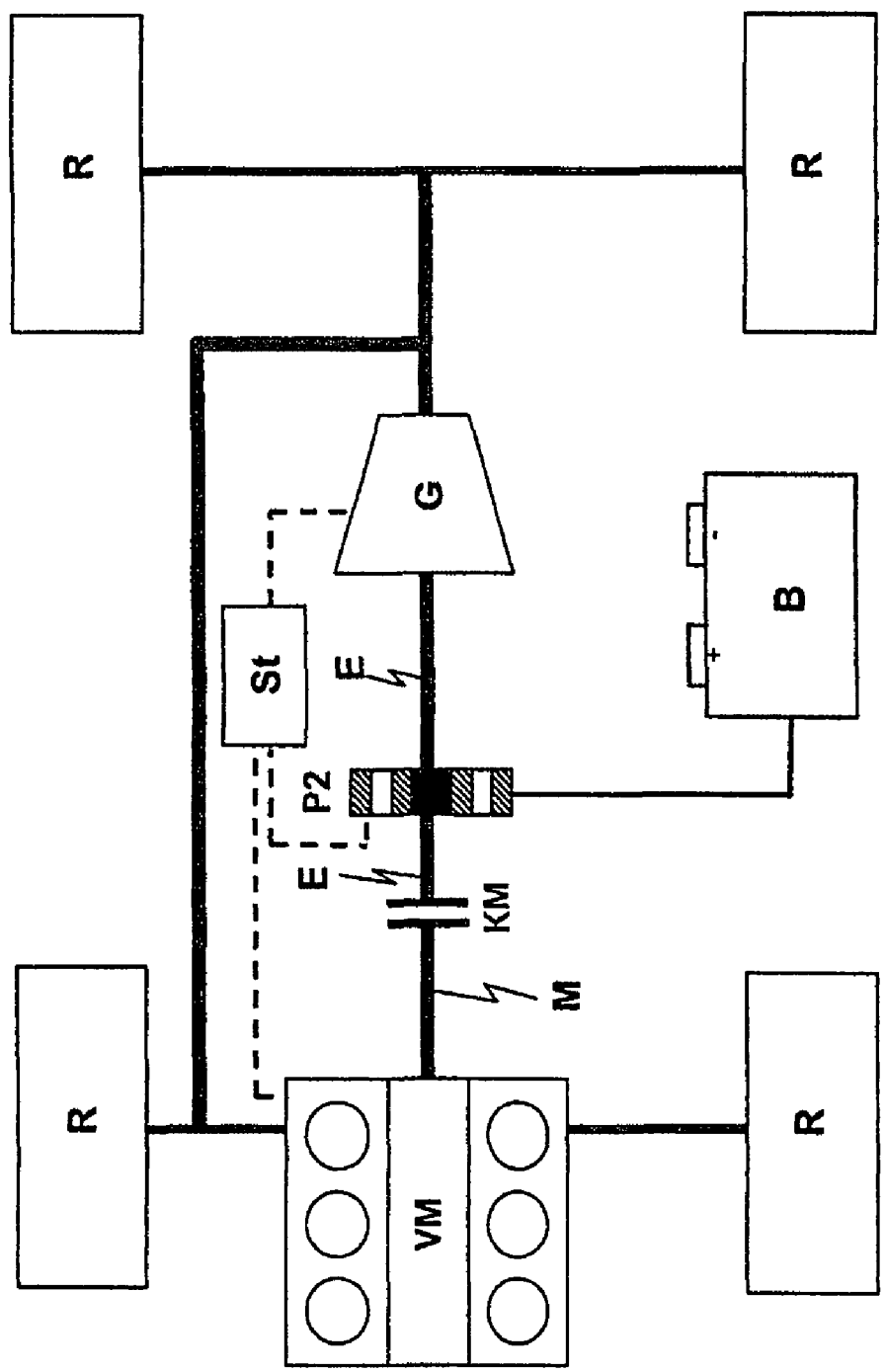
FIG. 3 shows a schematic configuration of a vehicle comprising an internal combustion engine and an electrical machine which is arranged on the transmission input shaft.
Figure 4:
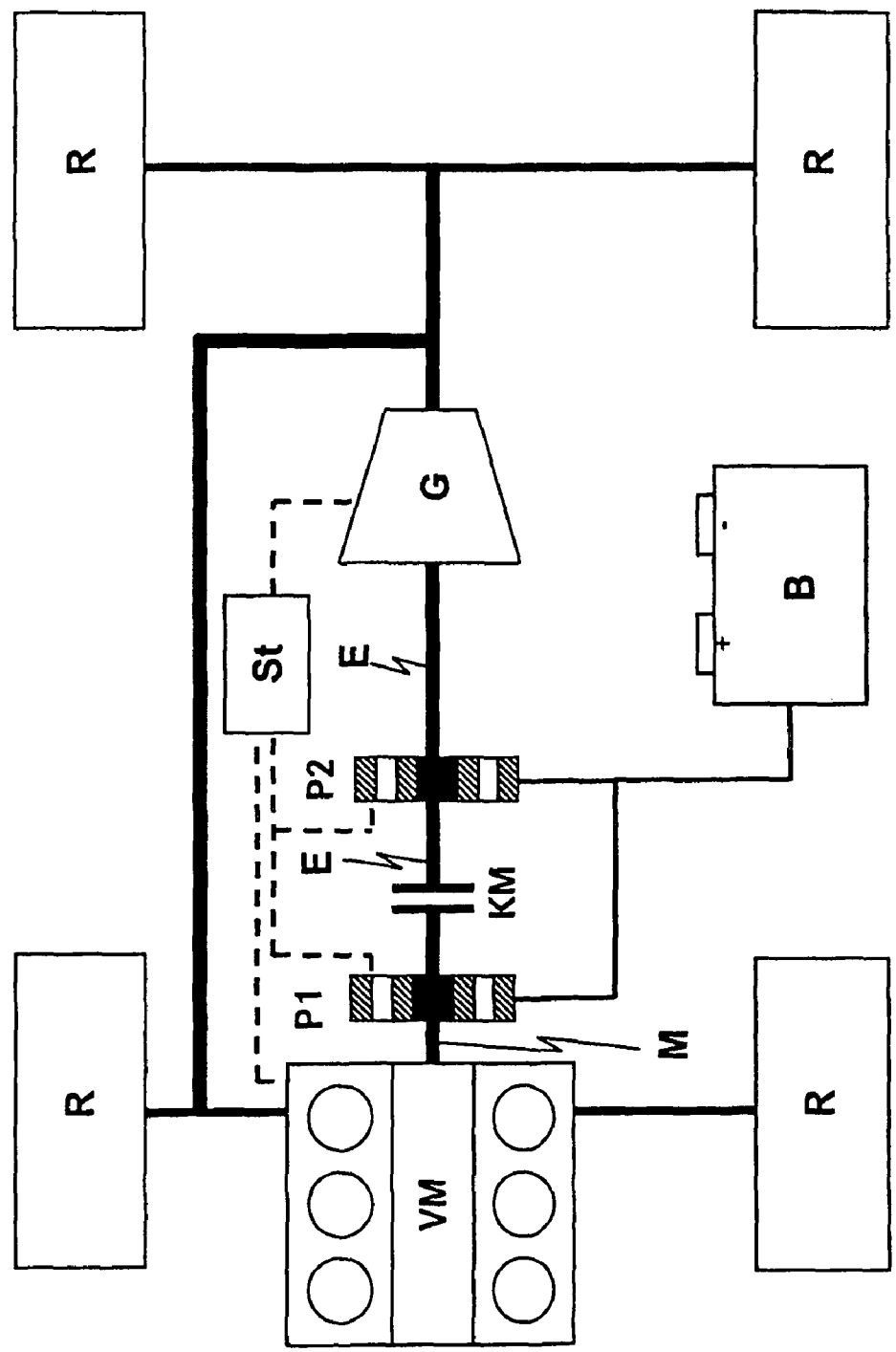
FIG. 4 shows a schematic configuration of a vehicle comprising an internal combustion engine and two electrical machines.

FIGS. 3 and 4 illustrate alternative arrangements to FIG. 2. Identical elements are generally provided with the same reference symbols. Furthermore, reference can be made to the description of the exemplary embodiment shown in FIG. 2 with regard to features and functions which remain the same. The following description is limited essentially to the differences from the exemplary embodiment shown in FIG. 2.

Apart from the provision of an electrical machine P2, the vehicle which is illustrated in FIG. 3 substantially corresponds to the vehicle of FIG. 2. Instead of the electrical machine P1, which is arranged on the motor shaft M in the exemplary embodiment of FIG. 2, in FIG. 3 the electrical machine P2 is arranged on the transmission input shaft E.

The electrical machine P2 has a stator which is fixed to the housing and interacts with a rotor for generating a drive torque and/or for recuperating of electrical energy. The rotor is connected to the transmission input shaft E such that it is fixed to the drive, with the result that a torque can be fed to the drive train or else a torque which is present in the drive train can be used (at least partially) to recuperate electrical energy by means of the electrical machine P2, in addition to the internal combustion engine VM.

Therefore, according to the invention, the torque which is required for acceleration of the internal combustion engine VM can be compensated for by the electrical machine P2, and a braking torque on the wheel R can therefore be kept approximately constant.

The electrical machine P2 is fed by the battery B. In generator mode, the electrical machine P2 supplies energy to the battery B.

The electrical machine P2 and the internal combustion engine VM and the stepped automated transmission G are controlled and operated by at least one control device St according to the invention. Interaction with further control devices is likewise possible.

If the clutch KM is opened, for example for a gear-shifting operation, the operative connection between the internal combustion engine VM and the transmission input G is interrupted. This is called an interruption in the tractive force.

According to the invention, the torque of the internal combustion engine VM which is missing at the transmission input G during the interruption in the tractive force can be compensated for by the electrical machine P2. The interrupted operative connection between the internal combustion engine VM and the transmission input G therefore has no effect on the torque at the transmission output and therefore on the driven wheels R.

In addition to the internal combustion engine VM, the exemplary embodiment according to FIG. 4 has two electrical machines, specifically the electrical machine P1 on the motor shaft M and the electrical machine P2 on the transmission input shaft E.

The two electrical machines P1, P2 and the internal combustion engine VM and the stepped automated transmission G are controlled by at least one control device St according to the invention.

In accordance with the statements made regarding the exemplary embodiments of FIGS. 2 and 3, the sum of the torques of the electrical machines P1, P2 is to be regarded as compensating for the torque of the internal combustion engine VM. The two electrical machines P1, P2 can therefore be controlled in such a way that, for example, an optimum overall efficiency is achieved.

It is possible, for example, for the compensation torque for acceleration of the internal combustion engine VM to be provided by one of the electrical machines P1, P2, while the other provides a recuperation torque or drive torque.

In an inventive drive train according to FIG. 2 or 4, the electrical machines P1 can advantageously be designed as directly connected or belt-driven starter generators.

Equally, an electrical machine P1, P2 can be designed as a generator, which is operated exclusively as a generator, or a traction motor.

What is claimed is:

1. A method for controlling a drive train of a vehicle, comprising an internal combustion engine (VM), two electrical machines, wherein at least one of the two electrical machines (P1, P2) can be operated at least as a generator, a stepped automated gear shift transmission (G) with a transmission input (E) and at least one control device (St) for controlling the internal combustion engine (VM), the two electrical machines (P1, P2) and the stepped automated gear shift transmission (G), said method comprising the steps of:

keeping a braking torque on at least one driven wheel (R) approximately constant by one of the two electrical machines before, during and after a gear-shifting operation to a gear with a higher transmission ratio i during an energy recuperation mode and reducing a recuperation torque by an amount of torque which is required for an acceleration of the internal combustion engine (VM) to a speed where an operative connection is established between the internal combustion engine (VM) and the transmission input (E) during the gear-shifting operation when the recuperation torque is greater than, or equal to, the torque which is required for the acceleration of the internal combustion engine (VM), and providing a drive torque, by the other of the two electrical machines (P1, P2), whose magnitude corresponds to the difference between the recuperation torque and the torque required for the acceleration of the internal combustion engine (VM) when the recuperation torque is less than the torque required for the acceleration of the internal combustion engine (VM) so as to efficiently compensate for the torque which is required for the acceleration of the internal combustion engine (VM) to the speed where the operative connection is established between the internal combustion engine (VM) and the transmission input (E) during the gear-shifting operation.

2. The method as claimed in claim 1, wherein, in the drive train in which the operative connection between the internal combustion engine (VM) and the transmission input is interrupted during the gear-shifting operation, any missing torque of the internal combustion engine (VM) is provided by at least one of the two electrical machines (P1, P2).

3. A drive train of a motor vehicle comprising
an internal combustion engine (VM),
electrical machines (P1, P2), wherein at least one of the electrical machines (P1, P2) can be operated as a motor and as a generator,
a stepped automated gear shift transmission (G) with a transmission input (E) and
at least one control device (St) for controlling the internal combustion engine (VM), the at least one electrical machine (P1, P2) and the stepped automated gear shift transmission (G)
the control device (St) including means for adjusting a braking torque on at least one driven wheel (R) to an approximately constant value before, during and after a gear-shifting operation to a gear with a higher transmission ratio i with the aid of at least one of the electrical machines (P1, P2) and the control device (St) compensating for a deficient torque of the internal combustion engine (VM) by using the other of the electrical machines (P1, P2) for providing the deficient torque when an operative connection between the internal combustion engine (VM) and the transmission input (E) is interrupted during the gear-shifting operation so as to supply the deficient torque which is required for acceleration of the internal combustion engine (VM) to a speed where the operative connection is established between the internal combustion engine (VM) and the transmission input (E) during the gear-shifting operation to a gear with a higher transmission ratio i.

4. The drive train of the vehicle claimed in claim 3, wherein at least one of the electrical machines (P1, P2) is a traction motor.

5. The drive train of the vehicle claimed in claim 3, wherein at least one of the electrical machines (P1, P2) is a starter generator.

6. The drive train of the vehicle claimed in claim 3, wherein one of the electrical machines (P1, P2) is a generator which is not operated as a motor.

* * * * *